United States Patent
Stanga et al.

(10) Patent No.: US 7,767,764 B2
(45) Date of Patent: *Aug. 3, 2010

(54) FLUOROELASTOMERS

(75) Inventors: Milena Stanga, Varese (IT); Francesco Triulzi, Milan (IT); Margherita Albano, Milan (IT)

(73) Assignee: Solvay Solexis S.p.A., Milan (IT)

( * ) Notice: Subject to any disclaimer, the term of this patent is extended or adjusted under 35 U.S.C. 154(b) by 0 days.

This patent is subject to a terminal disclaimer.

(21) Appl. No.: 12/162,458

(22) PCT Filed: Jan. 15, 2007

(86) PCT No.: PCT/EP2007/050353

§ 371 (c)(1),
(2), (4) Date: Jul. 28, 2008

(87) PCT Pub. No.: WO2007/085546

PCT Pub. Date: Aug. 2, 2007

(65) Prior Publication Data

US 2009/0030153 A1    Jan. 29, 2009

(30) Foreign Application Priority Data

Jan. 27, 2006  (IT)  ............. MI2006A0139

(51) Int. Cl.
*C08F 14/18* (2006.01)

(52) U.S. Cl. ............. 525/326.2; 525/200; 525/199; 525/231; 526/242; 526/266; 526/247; 526/253; 526/250; 526/252; 526/249

(58) Field of Classification Search ............ 525/200, 525/326.2, 199, 231; 526/242, 266, 247, 526/253, 250, 252, 249
See application file for complete search history.

(56) References Cited

U.S. PATENT DOCUMENTS

| 6,844,036 B2 * | 1/2005 | Apostolo et al. | ........... 428/35.7 |
| 2003/0088040 A1 * | 5/2003 | Arrigoni et al. | ............. 526/255 |
| 2005/0245691 A1 * | 11/2005 | Stanga et al. | ............. 525/331.1 |
| 2007/0093625 A1 * | 4/2007 | Arrigoni et al. | ............. 526/253 |

FOREIGN PATENT DOCUMENTS

| EP | 1 621 557 A2 | 1/2006 |
| JP | 2004-163927 A | 6/2004 |
| JP | 2004-219579 A | 8/2004 |

* cited by examiner

*Primary Examiner*—Vasu Jagannathan
*Assistant Examiner*—Robert C Boyle
(74) *Attorney, Agent, or Firm*—Arent Fox LLP

(57) ABSTRACT

VDF curable fluoroelastomers, ionically cured, having a compression set after a time of 24 h (ASTM D 39/B) at −10° C. lower than 60%, preferably lower than 50% and at −25° C. lower than 90%, preferably lower than 75%, comprising hexafluoropropene (HFP) in amounts higher than 10% by moles and one vinylether of formula: $CF_2=CFOCF_2OCF_3$ (a), an amount of —COF and groups in the polymer lower than the sensitivity limit of the method using the FT-IR spectroscopy described in the present application.

28 Claims, No Drawings

1

FLUOROELASTOMERS

CROSS-REFERENCE TO RELATED APPLICATION

This application is a National Stage entry of International Application No. PCT/EP2007/050353, filed Jan. 14, 2007, the entire specification and claims of which are incorporated herewith by reference.

The present invention relates to ionically cured VDF fluoroelastomers showing improved sealing properties (compression set) at temperatures lower than 0° C., in particular from −10° C. up to −25° C., combined with good mechanical properties, at high and at low temperatures.

More specifically the present invention relates to ionically cured fluoroelastomers having improved compression set values up to −25° C., and substantially —COF end group free, these end groups being undetectable by the method indicated hereinafter. The fluoroelastomers of the present invention are obtainable by a polymerization process showing improved productivity.

It is well known that fluoroelastomers are polymers particularly useful in the automotive, aerospace, oil, petrochemical and electronic industry thanks to their thermal and chemical resistance properties, good mechanical properties and compression set. However it is required that these polymers show an improved combination of the above properties in a wide range of temperatures, both at high and at low temperatures. Besides, it is required that at temperatures lower than 0° C., in particular from −10° C. up to −25° C., the fluoroelastomers have also improved compression set properties, in particular lower than 60% at −10° C., preferably lower than 50% and lower than 90% at −25° C., preferably lower than 75%.

Various fluoroelastomers are known, however in the prior art the values of the —COF polymer end groups and compression set at temperatures lower than 0° C., in particular at −10° C. up to −25° C., are not reported. The Applicant has found that, when the polymers have —COF end groups, the fluoroelastomers do not show high mechanical and elastomeric properties.

However, as said, it is required that for special applications, especially in the automotive, aerospace and oil industry fields, the fluoroelastomers have compression set properties, as defined above, also at temperatures lower than 0° C., in particular from −10° C. up to −25° C.

U.S. Pat. No. 3,450,684 relates to vinylethers of formula:

wherein $X^0$=F, Cl, $CF_3$, H and n' can range from 1 to 20.

Also the homopolymers obtained by UV polymerization are reported. The exemplified copolymers are not characterized by their mechanical and elastomeric properties at low temperatures.

U.S. Pat. No. 4,487,903 relates to the preparation of fluoroelastomeric copolymers by using perfluorovinylethers of formula:

wherein $n^0$ ranges from 1 to 4; $Y^0$=F, Cl, $CF_3$, H; $X^2$ can be $C_1$-$C_3$ perfluoroalkyl group, $C_1$-$C_3$ ω-hydroperfluoroalkyl group, $C_1$-$C_3$ ω-chloroperfluoroalkyl group. The polymer has a content of fluorovinylether ranging from 15 to 50% by moles. These vinylethers give copolymers with improved properties at low temperatures than those obtained by using as ether perfluoropropylvinylether (PPVE) and perfluoromethylvinylether (PMVE). The reactivity of the vinylethers is very low and it is difficult to obtain high molecular weight polymers and thus polymers with good elastomeric properties for the mentioned applications. Also in this case no characterization data of the cured elastomer are given, the compression set at temperatures lower than 0° C., in particular at −10° C. and at −25° C., is not reported.

Other problems shown in the prior art relate to the low perfluorovinylether reactivity, and hence to the need to recover unreacted monomers (see GB patent 1,514,700); the stability problems for polymers having —C(O)F end groups (see U.S. Pat. No. 3,635,926). These —C(O)F eng groups can be further transformed with suitable reactants to increase the polymer stability (see EP 178,935).

Other patents describing vinylethers for obtaining fluoroelastomers are known. See U.S. Pat. No. 6,255,536, EP 1,117,710, U.S. Pat. No. 5,696,216. However neither compression set at temperatures lower than 0° C., in particular at −10° C. and at −25° C. are reported, nor the —C(O)F end groups values.

EP 1,304,341 describes fluoroelastomers containing fluoroalkoxyvinylethers of formula $CFX_4$=$CX_4OCF_2OR_4$, wherein $X_4$=F, H; $R_4$ is $C_2$-$C_6$ perfluoroalkyl group, perfluorooxyalkyl group or $C_5$-$C_6$ cyclic (per)fluoroalkyl group. In particular the following perfluoroalkoxyvinylethers: $CF_2$=$CFOCF_2OCF_2CF_3$ (MOVE 1) and $CF_2$=$CFOCF_2O$—$CF_2CF_2OCF_3$ (MOVE 2) are described. Tests carried out by the Applicant have shown that said fluoroelastomers have —COF type polymer end groups. As said, the terminal groups worsen the mechanical properties at high temperatures and the thermal resistance of said polymers. Compression set values at temperatures lower than 0° C., in particular at −10° C. and at −25° C., are not reported.

U.S. Pat. No. 5,260,393 describes fluoroelastomeric copolymers, suitable to the preparation of O-rings, based on monomeric units deriving from vinylydenfluoride (VDF), hexafluoropropene (HFP), perfluoroalkylvinylethers (PAVE) as, for example, methylvinylether and optionally tetrafluoroethylene (TFE). These polymers are ionically curable and have good elastomeric properties at low and at high temperatures and show good processability, at the detachment from the molds after curing. In this patent the compression set values at temperatures lower than 0° C., in particular at −10° C. and at −25° C., are not reported. Tests carried out by the Applicant have shown that the compression set values at −10° C. and at −25° C. are not good and therefore the sealing properties at low temperatures are poor.

The need was felt to have available cured VDF fluoroelastomers having the following combination of properties:
  substantial absence of —COF end groups, the end groups not being detectable by the method indicated hereinafter;
  improved mechanical properties and compression set in a wide range of temperatures, both at high and at low temperatures; in particular at −10° C. up to −25° C.;
  improved productivity in the process for preparing fluoroelastomers, expressed as (Kg of polymer)/(hour×liter of water).

The Applicant has unexpectedly and surprisingly found cured fluoroelatomers having an improved combination of the above properties.

It is an object of the present invention ionically cured VDF fluoroelastomers, having a compression set after 24 hours (ASTM D 395/B) at −10° C. lower than 60%, preferably lower than 50% and at −25° C. lower than 90%, preferably lower than 75%, comprising hexafluoropropene (HFP) in an amount higher than 10% by moles and a vinylether of formula:

$$CF_2=CFOCF_2OCF_3 \qquad (a)$$

and having an amount of —COF end polymer groups, bands at 1,900-1,830 cm$^{-1}$, lower than the sensitivity limit of the following method: at the end of the polymerization of the monomer the polymer is isolated through coagulation by freezing and successive defrosting; then the polymer is washed twice with demineralized water and dried in stove up to a constant weight; the —COF end polymer groups are determined by FT-IR spectroscopy on a polymer film having a thickness from 50 to 300 micron by initially scanning between 4000 cm$^{-1}$ and 400 cm$^{-1}$ to obtain the initial spectrum, keeping the film for 12 hours in environment saturated with ammonia vapours and then recording the IR final spectrum under the same conditions of the initial IR spectrum; subtraction from the initial spectrum the final spectrum to obtain the "difference spectrum", which is normalized by the following equation:

$$\frac{\text{"Difference spectrum"}}{[\text{film weight (g)/film area (cm}^2)]};$$

then the optical densities related to the —COF end groups which have reacted with the ammonia vapours are measured and converted into mmoles/kg of polymer by using the extinction coefficients reported in Table 1, page 73, of the article by M. Pianca et al. "End groups in fluoropolymers", J. Fluorine Chem. 95 (1999), 71-84 (herein incorporated by reference); the found values express the concentrations of the residual —COF end groups as mmoles of —COF end groups/kg of polymer: in the fluoroelastomer spectrum of the invention no bands related to —COF end groups (1900-1830 cm$^{-1}$) are detectable, the method sensitivity limit being 0.05 mmoles/Kg.

More specifically the amount of —COF end groups in the polymer is determined by using the Nicolet® Nexus FT-IR equipment (256 scannings, resolution 2 cm$^{-1}$).

In the polymer small amounts, between 0.01 and 5% by moles with respect to the total monomers moles, of units deriving from a fluorinated bis-olefin, can be present. The bis-olefins described in EP 661,304, herein incorporated by reference, can for example be used.

Preferably the bis-olefin optionally used has formula:

$$CH_2=CH-(CF_2)_{t0}-CH=CH_2$$

wherein t0 is an integer from 6 to 10.

Optionally the fluoroelastomers of the invention are in admixture with a semicrystalline (per)fluoropolymer; the amount of said fluoroelastomers, expressed in percent by weight referred to the total of the dry weight of the mixture fluoroelastomer+semicrystalline (per)fluoropolymer, being from 0% to 70% by weight, preferably from 5% to 50% by weight, still more preferably from 10% to 30% by weight.

Semicrystalline (per)fluoropolymer means a (per)fluoropolymer showing, besides the glass transition temperature Tg, at least one crystalline melting temperature.

The semicrystalline (per)fluoropolymer is formed of tetrafluoroethylene (TFE) homopolymers, or TFE copolymers with one or more monomers containing one unsaturation of ethylene type, in amounts from 0.01% to 10% by moles, preferably from 0.05% to 7% by moles on the total of the monomers.

Said comonomers having one ethylene unsaturation are of hydrogenated and fluorinated type. Among the hydrogenated ones, ethylene, propylene, acrylic monomers, for example methylmethacrylate, (meth)acrylic acid, butylacrylate, hydroxyethylhexylacrylate, styrene monomers, can be mentioned.

Among fluorinated comonomers it can be mentioned:
- $C_3$-$C_8$ perfluoroolefins as hexafluoropropene (HFP), hexafluoroisobutene;
- $C_2$-$C_8$ hydrogenated fluoroolefins as vinyl fluoride (VF), vinylidene fluoride (VDF), trifluoroethylene, $CH_2=CH-R_f$ perfluoroalkylethylene, wherein $R_f$ is a $C_1$-$C_6$ perfluoroalkyl;
- $C_2$-$C_8$ chloro- and/or bromo- and/or iodo-fluoroolefins as chlorotrifluoroethylene (CTFE);
- $CF_2=CFOR_f$ (per)fluoroalkylvinylethers (PAVE), wherein $R_f$ is a $C_1$-$C_6$ (per)fluoroalkyl, for example $CF_3$, $C_2F_5$, $C_3F_7$;
- $CF_2=CFOX$ (per)fluorooxyalkylvinylethers wherein X is: a $C_1$-$C_{12}$ alkyl, or a $C_1$-$C_{12}$ oxyalkyl, or a $C_1$-$C_{12}$ (per)fluorooxyalkyl having one or more ether groups, for example perfluoro-2-propoxy-propyl; fluorodioxoles, preferably perfluorodioxoles.

PAVEs, in particular perfluoromethyl-, ethyl-, propylvinylether and fluorodioxoles, preferably perfluorodioxoles, are preferred comonomers.

When the fluoroelastomers of the present invention contain semicrystalline (per)fluoropolymers, mixing is carried out by mixing in the desired ratios the fluoroelastomer latex with the semicrystalline perfluoropolymer latex and then co-coagulating the obtained mixture as described in U.S. Pat. No. 6,395,834 and U.S. Pat. No. 6,310,142.

Alternatively the semicrystalline (per)fluoropolymer can be polymerized and then the fluoroelastomer is polymerized on the (per)fluoropolymer particles. A core-shell structure is thus obtained.

The Applicant has found that, when the —COF end groups in the fluoroelastomers are substantially absent according to the above method, the best combination of mechanical properties and compression set is obtained in a wide range of temperatures, both at high and at low temperatures.

The fluoroelastomers of the present invention, having an amount of —COF end groups lower than 0.05 mmoles/Kg, can be mixed with fluoroelastomers obtainable from polymers containing an amount of —COF end groups higher than 0.05 mmoles/Kg, provided that the amount of the fluoroelastomers of the present invention is at least 5-10% by weight, preferably 20-40% by weight, more preferably 50% by weight with respect to the total weight of the fluoroelastomers in the final composition. These compositions can be obtained in various ways. For example, if monomers giving —COF end groups, for example perfluoropropylvinylether, are used in polymerization, in order to obtain improved properties according to the present invention, a portion of the polymerization is carried out in the absence of the comonomers giving —COF polymer end groups, so to obtain a polymer fraction substantially —COF end group free, allowing to obtain the combination of the above properties. For example the polymer fraction —COF end group free must be at least 5-10% by weight, preferably 20-40% by weight, more preferably 50% by weight. An alternative procedure is to mix the polymer fraction substantially —COF end group free with polymers containing —COF in the above ratios.

The fluoroelastomeric polymers containing —COF end groups in amounts higher than 0.05 mmoles/Kg comprise the following comonomers:

(per)fluorodioxoles, preferably having the following formula:

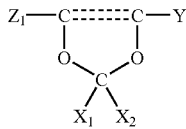

(2)

wherein

Y=F, ORf$_1$, Rf$_1$ being a C$_1$-C$_5$ perfluoroalkyl, preferably Rf$_1$ is CF$_3$;

X$_1$ and X$_2$, equal to or different from each other, are selected between F and CF$_3$, preferably F;

Z$_1$ is selected from F, H, Cl, preferably F;

perfluoroalkylvinylethers of formula CF$_2$=CFORf, wherein Rf is a C$_3$ perfluoroalkyl;

CF$_2$=CFOXa perfluorooxyalkylvinylethers, wherein Xa is C$_3$-C$_{12}$ perfluorooxyalkyl having one or more ether groups, for example perfluoro-2-propoxy-propyl;

fluorovinylethers (MOVE) of general formula CFX$_{AI}$=CX$_{AI}$OCF$_2$OR$_{AI}$, wherein R$_{AI}$ is a linear or branched C$_2$-C$_6$ (per)fluoroalkyl group, or cyclic C$_5$-C$_6$ group, or a linear or branched when possible C$_2$-C$_6$ (per)fluorooxyalkyl group, containing from one to three oxygen atoms; when R$_{AI}$ is fluoroalkyl or fluorooxyalkyl group as above it can contain from 1 to 2 atoms, equal or different, selected from the following: H, Cl, Br, I; X$_{AI}$=F, H; the compounds of general formula: CFX$_{AI}$=CX$_{AI}$OCF$_2$OCF$_2$CF$_2$Y$_{AI}$ are preferred, wherein Y$_{AI}$=F, OCF$_3$; X$_{AI}$ as above; in particular (MOVE 1) CF$_2$=CFOCF$_2$OCF$_2$CF$_3$ and (MOVE 2) CF$_2$=CFOCF$_2$OCF$_2$CF$_2$OCF$_3$.

The ionically cured fluoroelastomers preferably comprise the following monomers (% by moles):

VDF from 40 to 90%, preferably 50-80%;

monomer of formula (a) from 2 to 20%, preferably 6-14%;

HFP from 10 to 30%, preferably 12-20%;

optionally one or more (per)fluorinated comonomers having at least one ethylene type unsaturation from 0 to 30%;

the sum of the molar percentages of the monomers being 100%.

With elastomeric polymers, polymers not showing melting peaks at DSC are meant, as the crystalline part must be substantially absent.

When, besides VDF and HFP and monomer (a), other comonomers are present, they are selected from the following:

C$_2$-C$_8$ perfluoroolefins, for example TFE, hexafluoroisobutene;

perfluoroalkylvinylethers of formula CF$_2$=CFORf, wherein Rf is a C$_1$-C$_2$ perfluoroalkyl group, preferably Rf=CF$_3$.

Preferred comonomers, when in the polymer, besides VDF, HFP and monomer (a), other monomers are present, are tetrafluoroethylene (TFE) and/or perfluoromethylvinylether (PMVE).

Preferred fluoroelastomeric compositions, (% moles), the sum of the molar monomer percentages being 100%, are the following:

VDF from 40 to 90%, preferably 50-80%;

monomer of formula (a) from 2 to 20%, preferably 6-14%;

HFP from 10 to 30%, preferably 12-20%;

optionally

PMVE from 0 to 15%, preferably 3-10%;

and/or

TFE from 0 to 30%, preferably 5-20%.

As said, the ionically cured fluoroelastomers show the improved combination of the above properties, in particular compression set values at −10° C. lower than 60%, preferably lower than 50% and at −25° C. lower than 90%, preferably lower than 75%. These compression set values show that the fluoroelastomer of the invention maintains elastomeric properties even at these temperatures. It must be noted that the best ionically cured products on the market do not show high elastomeric properties at −10° C. and at −25° C. (see the Examples).

The fluoroelastomers of the present invention generally show a Tg between −25° C. and −40° C., preferably between −30° C. and −34° C.

The Applicant has unexpectedly and surprisingly found that the fluoroelastomers of the present invention are obtained with high polymerization kinetics, therefore with high yields.

The fluoroelastomers are prepared by polymerization of the monomers in aqueous emulsion in the presence of an emulsion, dispersion or microemulsion of perfluoropolyoxyalkylenes, according to U.S. Pat. No. 4,789,717 and U.S. Pat. No. 4,864,006. Preferably the synthesis is carried out in the presence of a microemulsion of perfluoropolyoxyalkylenes.

According to known methods of the prior art, radical initiators, such as persulphates, perphosphates, alkaline or ammonium perborates or percarbonates, optionally in combination with ferrous, cuprous or silver salts, or other easily oxidizable metals, are used. In the reaction medium also surfactants of various kind, are optionally present, among which the fluorinated surfactants of formula:

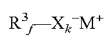

$R^3_f$—$X_k^-$$M^+$ are particularly preferred, wherein $R^3_f$ is a C$_5$-C$_{16}$ (per)fluoroalkyl chain or a (per)fluoropolyoxyalkyl chain, $X_k^-$ is —COO$^-$ or —SO$_3^-$, M$^+$ is selected from: H$^+$, NH$_4^+$, or one alkaline metal ion. Among the most commonly used we remember: ammonium perfluorooctanoate, (per)fluoropolyoxyalkylenes ended with one or more carboxylic groups, etc. See U.S. Pat. No. 4,990,283 and U.S. Pat. No. 4,864,006.

The polymerization reaction is generally carried out at temperatures comprised between 25° C. and 150° C., at a pressure between the atmospheric one up to 10 MPa.

As chain transfer agents, the ones known in the prior art, such as ethyl acetate, diethylmalonate, ethane, etc., can be used.

The semicrystalline (per)fluoropolymers, optional components of the present invention, are prepared according to the emulsion or microemulsion polymerization methods described above for the fluoroelastomers of the invention.

Ionic curing is carried out by using accelerating and curing agents.

As an accelerating agent, an organic-onium derivative is used. The organic-onium derivatives usable for the invention generally contain at least one heteroatom, for example N, P, S, O linked to organic or inorganic groups. The organic-onium compounds suitable to be used in the invention are for example those described in U.S. Pat. No. 3,655,727, U.S. Pat.

No. 3,712,877, U.S. Pat. No. 3,857,807, U.S. Pat. No. 3,686,143, U.S. Pat. No. 3,933,732, U.S. Pat. No. 3,876,654, U.S. Pat. No. 4,233,421, U.S. Pat. No. 4,259,463, U.S. Pat. No. 4,882,390, U.S. Pat. No. 4,912,171, U.S. Pat. No. 5,591,804, EP 182,299, EP 120,462; West and Holcomb, "Fluorinated Elastomers", Kirk-Othmer, Encyclopedia of Chemical Technology, vol. 8, 3rd Ed. John Wiley & Sons, Inc., pages 500-515 (1979).

The organic-onium compounds which can be used belong for example to the following classes:

A) compounds having general formula:

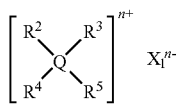

(I)

wherein:

Q has the following meanings: nitrogen, phosphorus, arsenic, antimony, sulphur;

$X_I$ is an organic or an inorganic anion as for example halide, sulphate, acetate, phosphate, phosphonate, hydroxide, alkoxide, phenate, bisphenate;

n is the valence of the $X_I$ ion;

$R^2$, $R^3$, $R^4$, $R^5$, independently the one from the other, have the following meanings:

$C_1$-$C_{20}$ alkyl $C_6$-$C_{20}$ aryl or arylalkyl, $C_1$-$C_{20}$ alkenyls, or a combination thereof;

halogen, selected from chlorine, fluorine, bromine;

or cyano groups, —ORB and COOR$_B$, wherein R$_B$ is an alkyl aryl, arylalkyl or alkenyl having the above meanings;

wherein two radicals of the group $R^2$, $R^3$, $R^4$, $R^5$ can form with the heteroatom Q a cyclic structure;

when Q is a sulphur atom, one of the radicals $R^2$, $R^3$, $R^4$, $R^5$ is not present;

B) amino-phosphonium derivatives having the following general formulas:

(II)

(III)

wherein:

$R^6$, $R^7$ and $R^8$, equal or different, have the following meanings:

$C_1$-$C_{18}$, preferably $C_1$-$C_{12}$ alkyl, $C_4$-$C_7$ cycloalkyl, $C_6$-$C_{18}$, preferably $C_6$-$C_{12}$ aryl or arylalkyl;

oxyalkyl or poly(oxyalkyl) wherein the alkyl is as above and the polyoxyalkyl radical has a free or etherified terminal OH function;

$R^6$, $R^7$ and $R^8$ can optionally contain halogens, CN, OH, carbalkoxy groups;

wherein $R^6$ and $R^7$ can form with the nitrogen atom an heterocyclic ring;

$R^9$ is a $C_1$-$C_6$ alkylenic, oxyalkylenic or $C_6$-$C_{12}$ arylenic bivalent radical;

nl is an integer from 1 to 4;

r is an integer from 1 to 3;

ml is an integer from 1 to 2 and corresponds to the valence of the Y ion;

p is a coefficient such that ml×p=2;

Y is an anion having valence m and can be organic or inorganic; for example Y can be selected from halides, perchlorate, nitrate, tetrafluoroborate, hexafluorophosphate, oxalate, acetate, stearate, haloacetate, para-toluenesulphonate, phenate, bisphenate, hydroxide; Y can also be a complex anion for example $ZnCl_4^{2-}$, $CdCl_4^{2-}$, $NiBr_4^{2-}$, $HgI_3^{-}$;

C) phosphoranes, in particular triarylphosphoranes, having formula:

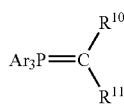

(IV)

wherein:

Ar is phenyl, substituted phenyl (as for example methoxyphenyl, chlorophenyl, tolyl), naphthyl;

$R^{10}$ is hydrogen, methyl, ethyl, propyl, carbalkoxy;

$R^{11}$ is carbalkoxy, $C_1$-$C_8$ alkyls, cyano and amidic group;

or $R^{10}$ with $R^{11}$ with the carbon atom of the P=C bond forms a cyclic group, for example cyclopentadiene;

D) iminium salts having formula:

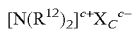

(V)

wherein:

$R^{12}$ is a monovalent organic radical ended with an heteroatom, as P, S, O or N, such that the organic radical is covalently linked to the nitrogen atom through said heteroatom;

c is the valence of the $X_C$ anion;

$X_C$ is an organic or inorganic anion, for example halide, hydroxide, sulphate, thiosulphate, nitrate, formate, acetate, cyanate, thiocyanate, tetraphenylborate, phosphate, phosphonate, alkoxide, phenate, bisphenate or perchlorate.

Preferably quaternary ammonium or phosphonium salts, see for example EP 335,705 and U.S. Pat. No. 3,876,654; amino-phosphonium salts, see for example U.S. Pat. No. 4,259,463; phosphoranes, see for example U.S. Pat. No. 3,752,787, are used.

Examples of the organic-onium derivatives of class A) are the following: triphenylbenzylphosphonium chloride, tetraphenylphosphonium chloride, tetrabutylammonium chloride, tetrabutylammonium bisulphate, tetrabutylammonium bromide, tributylallylphosphonium chloride, tributylbenzylphosphonium chloride, dibutyldiphenylphosphonium chloride, tetrabutylphosphonium chloride, triarylsulphonium chloride.

Examples of amino-phosphonium derivatives of class B) are benzyldiphenyl(diethylamino)phosphonium and benzyltris(dimethylamino)phosphonium salts.

An example of the compounds of class D) is 8-benzyl-1,8-diazabicyclo [5,4,0]-7-undecene chloride.

Mixtures of organic-onium derivatives can also be used.

As curing agents aromatic or aliphatic polyhydroxylated compounds or derivatives thereof can be used, as described for example in EP 335,705 and U.S. Pat. No. 4,233,427. For example di-, tri- and tetrahydroxybenzenes, naphthalenes, anthracenes and bisphenols of formula:

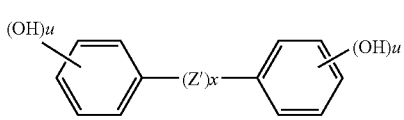

can be mentioned, wherein:

Z' has one of the following meanings:

linear or branched $C_1$-$C_{13}$ aliphatic, $C_4$-$C_{13}$ cycloaliphatic, $C_6$-$C_{13}$ aromatic or arylalkylenic bivalent radical, optionally substituted with at least one chlorine or fluorine atom;

a thio, oxy, carbonyl, sulphinyl or sulphonyl radical;

x is 0 or 1;

u is 1 or 2;

the aromatic rings of the compound of formula (VI) can optionally have other substituents selected from chlorine, fluorine or bromine; —CHO, $C_1$-$C_8$ alkoxy, —COOR$_{10}$, wherein R$_{10}$ is H or $C_1$-$C_8$ alkyl, $C_6$-$C_{14}$ aryl, $C_4$-$C_{12}$ cycloalkyl.

When in formula (VI) Z' is alkylene, it can for example be methylene, ethylene, chloroethylene, fluoroethylene, difluoroethylene, 1,3-propylene, tetramethylene, chlorotetramethylene, fluorotetramethylene, trifluorotetramethylene, 2-methyl-1,3-propylene, 2-methyl-1,2-propylene, pentamethylene, hexamethylene. When Z' is an alkylidene, it can for example be ethylidene, dichloroethylidene, difluoroethylidene, propylidene, isopropylidene, trifluoroisopropylidene, hexafluoroisopropylidene, butylidene, heptachlorobutyllidene, heptafluoro-butylidene, pentylidene, hexylidene, 1,1-cyclohexylidene.

When Z' is a cycloalkylene, it can for example be 1,4-cyclohexylene, 2-chloro-1,4-cyclohexylene, 2-fluoro-1,4-cyclo-hexylene, 1,3-cyclohexylene, cyclopentylene, chlorocyclopentylene, fluorocyclopentylene, and cycloheptylene. Furthermore Z' can be an arylene radical, as m-phenylene, p-phenylene, 2-chloro-1,4-phenylene, 2-fluoro-1,4-phenylene, o-phenylene, methylphenylene, dimethylphenylene, trimethylphenylene, tetramethylphenylene, 1,4-naphthylene, 3-fluoro-1,4-naphthylene, 5-chloro-1,4-naphthylene, 1,5-naphthylene and 2,6-naphthylene.

Among the curing agents of formula (VI) hexafluoroisopropylidene bis (4-hydroxybenzene), known as bisphenol AF, 4,4'-dihydroxydiphenylsulphone and isopropylidene bis(4-hydroxybenzene), known as bisphenol A, are preferred.

Other polyhydroxylic compounds usable as curing agents are for example dihydroxybenzenes as catechol, resorcinol, 2-methylresorcinol, 5-methylresorcinol, hydroquinone, 2-methyl-hydroquinone, 2,5-dimethylhydroquinone, 2-t-butylhydroquinone, 1,5-dihydroxynaphthalene.

Other polyol-based curing agents are the salts formed by the anion of a bisphenol with cations of alkaline metal, as for example the dipotassic salt of bisphenol AF and the monosodic monopotassic salt of bisphenol AF.

Furthermore, as curing agents, the salts of the accelerating agent with the curing agent can also be used, for example -onium bisphenates, i.e. the salts of a bisphenol wherein one or both the hydroxyls are in the form of -onium salts. As counterions of the bisphenate all the cations corresponding to the above organic-onium accelerant derivatives component b) can be used.

Other curing agents are for example described in EP 335, 705 and U.S. Pat. No. 4,233,427.

Instead of the accelerating and curing agent, an adduct between the accelerant and the curing agent can be used. In particular an adduct formed of bisphenol and an -onium salt is used, preferably in molar ratios curing agent:accelerating agent from 1:1 to 5:1, preferably from 2:1 to 5:1.

Said adducts are obtained by melting of the reaction product between the accelerating agent and the curing agent in the indicated molar ratios, or by melting of the adduct 1:1 added with the curing agent in the indicated amounts.

Optionally, when the adduct is used, an amount of free accelerating agent can also be present in addition to that contained in the adduct.

Optionally, preferably, when the adduct is used an amount of free curing agent can be present in addition to that contained in the adduct.

For the preparation of the adduct the following cations are particularly preferred: 1,1-diphenyl-1-benzyl-N-diethyl-phosphoranamine, tetrabutyl phosphonium, tetrabutyl ammonium; among anions the bisphenol compounds are particularly preferred, wherein the two aromatic rings are linked by an alkylenic group selected from the perfluoroalkylenic groups having from 3 to 7 carbon atoms, and the OH in the aromatic rings are in para position.

The preparation of the adduct is described in the European patents in the name of the Applicant EP 684,277, EP 684,276 herein incorporated by reference.

Other compounds usable as curing agents are the following:

difunctional fluoroethers and fluoropolyethers selected from the following:

$HOCH_2$—$CF_2OCF_2CF_2OCF_2$—$CH_2OH$ $HOCH_2$—$CF_2O(CF_2CF_2OCF_2CF_2OCF_2O)_zCF_2$—$CH_2OH$ $HOCH_2$—$CF_2CF_2OCF_2CF_2$—$CH_2OH$ $H_2NCH_2$—$CF_2O(CF_2CF_2OCF_2CF_2OCF_2O)_zCF_2$—$CH_2NH_2$ wherein z is an integer from 1 to 15.

These compounds are described in U.S. Pat. No. 4,810,760 and U.S. Pat. No. 4,894,418.

It is also possible to use the salts of the above difunctional fluoropolyethers, showing the advantage to be more easily incorporated in the fluoroelastomer. In said salts, at least one of the two end groups is an alcoholate of a metal, preferably a bivalent metal, or it is an ammonium salt when the starting end groups are aminic.

Examples of end groups of the first type are:

—$CH_2OMgOH$, —$CH_2OCaOH$, —$CH_2OZnOH$; an end group of the second type is for example —$CH_2NH_3^+Cl^-$.

Polyols wherein one or more hydroxyl groups are blocked as esters or carbonates. These compounds can be used as curing agents.

This class of compounds comprises polyhydroxylated compounds, in particular polyphenols and difunctional fluoropolyethers mentioned above, wherein at least one of the hydroxyl groups is substituted by an ester or carbonate group. These compounds are described in U.S. Pat. No. 5,728,773 and U.S. Pat. No. 5,929,169.

Polyols wherein one or more hydroxyl groups are blocked or protected in the form of silylethers. These compounds can be used as curing agents.

Said class of compounds comprises polyhydroxylated compounds, in particular polyphenols and difunctional fluoropolyethers mentioned above, wherein at least one of the hydroxyl groups is substituted by a —$OSiR^k_3$ group wherein $R^k$ is a radical having a $C_1$-$C_{20}$ aliphatic, linear or branched, $C_3$-$C_{20}$ cycloaliphatic or $C_6$-$C_{20}$ aromatic structure containing hydrogen and/or fluorine. 4,4'-hexafluoro isopropylidene-bis-(trimethyl silyl-diphenol) is preferred. This class of compounds is described in EP 879,851.

The curing blend also contains:
i) one or more acceptors of inorganic acids selected from those known in the ionic curing of vinylidene fluoride copolymers in amounts 1-40 parts per 100 parts of fluoroelastomeric copolymer;
ii) one or more basic compounds selected from those known in the ionic curing of vinylidene fluoride copolymers in amounts from 0.5 to 10 parts per 100 parts of fluoroelastomeric copolymer.

The basic compounds of point ii) are commonly selected from the group formed of $Ca(OH)_2$, $Sr(OH)_2$, $Ba(OH)_2$, metal salts of weak acids, such as carbonates, benzoates, oxalates and phosphites of Ca, Sr, Ba, Na and K and mixtures of the above hydroxides with the aforesaid metal salts; among the compounds of type i), Mgo can be mentioned.

The mentioned amounts of the blend components are referred to 100 phr of the fluoroelastomer of the invention. To the curing blend other conventional additives, such as thickeners, pigments, antioxidants, stabilizers, processing aids and the like can then be added.

As processing aids, esters and amides of fat acids, long chain aliphatic alcohols, low molecular weight polyethylene, stearic acid and its inorganic salts can be added to the curing blend. The aid amounts are generally lower than 10 phr, preferably lower than 5 phr.

Other compounds optionally added to the curable compositions of the present invention are substituted diorgan sulphur oxides, for example sulphones and sulpholanes. Said compounds are able to increase the blend curing rate. Said compounds are described for example in U.S. Pat. No. 4,287,320. The substituted diorgan sulphur oxides preferably contain at least one S atom, one or two oxygen atoms linked only to the sulphur atom, and two organic radicals R' and R" linked to the sulphur atom by carbon-sulphur bonds having general formula:

$$(R')(R'')S(O)_{xA} \quad (VI)$$

wherein:
xA is 1 or 2;
R' and R", equal or different, are organic radicals, containing from 1 to 20 or more carbon atoms, up to a maximum of 30; preferably from 1 to 8 carbon atoms; R' and R" together can form an only alkylene group, forming with the sulphur atom an heterocyclic ring; R' and R" being formed by a linear, branched or cyclic, or aromatic chain of carbon atoms, R' and R" can optionally contain heteroatoms, for example oxygen, and/or substituents, for example halides, alkoxy, sulphinyl, sulphonyl, carbalkoxy, oxy, hydroxyls, nitro, cyano, alkyls, aryls.

The substituted diorgan sulphur oxides comprise diorgan sulphoxides and diorgan sulphones and are for example described in "Organic Syntheses", Vol. I, pages 718-725, Vol. II, pages 1709-1715, Reinhold Publishing Co., N.Y., N.Y., 1957. Dimethylsulphone, tetramethylensulphone and bis(4-chlorophenyl)sulphone are particularly preferred. Tetramethylensulphone, in amounts from 0.01 to 5 phr, is preferably used.

The curing blend can preferably contain an inert filler selected from the following: carbon black, barium sulphate, silica, silicates, semicrystalline fluoropolymers. The semicrystalline fluoropolymers, as above, have preferably sizes from 5 to 90 nm, more preferably from 10 to 60.

The semicrystalline (per)fluoropolymers, optional components of the present invention, are prepared according to the emulsion or microemulsion polymerization methods described above for the fluoroelastomers of the invention.

The accelerating agent amount is preferably between 0.05 and 5 phr, that of the curing agent is preferably between 0.15 and 4 phr.

The amount of acid acceptors is comprised between 1 and 40 phr, the amount of basic compounds between 0 and 20 phr.

The monomer of formula (a) $CF_3OCF_2OCF=CF_2$ can be prepared by the following process:

I reaction in liquid phase of the fluoroformate $CF_3OCOF$ with elemental fluorine and olefinic compounds having formula:

$$CAF=CA'F \quad (IV)$$

to obtain the fluorohalogenether of formula:

$$CF_3OCF_2OCFACF_2A' \quad (V)$$

wherein A and A', equal or different the one from the other, are H, Cl or Br, with the proviso that they are not both H; the temperature ranging from −120° C. to −20° C., preferably from −100° C. to −40° C., optionally one operates in the presence of a perhalogenated solvent, liquid and inert under the reaction conditions, optionally the fluorine is diluted with an inert gas, for example, nitrogen or helium;

II dehalogenation, when A and A' are both halogen, or dehydrohalogenation, when one of A or A' is hydrogen and the other is halogen, of compound (V).

The dehalogenation or dehydrohalogenation reactions used are well known in the prior art. The molar ratio $CF_3OF$/CO is between 0.1 and 10, preferably between 0.2 and 5, more preferably between 0.5 and 2. The optional perhalogenated solvent used in the fluorination of the fluoroformate step I is preferably an organic compound containing fluorine and/or chlorine, optionally one or more oxygen atoms in the chain and/or amine groups at the ends thereof.

When the perhalogenated solvent is perfluorinated, it can, for example, be selected from perfluorocarbons, perfluoroethers, perfluoropolyethers, perfluoroamines, or mixtures thereof.

The fluoroformate $CF_3OCOF$ can be prepared with high conversion and selectivity by thermal reaction in gaseous phase of $CF_3OF$ (fluoroxyperfluoromethane) and CO by feeding the reactants in a reactor maintained at temperatures in the range 80° C.-250° C., preferably 120° C.-230° C., still more preferably 150° C.-200° C.

The reaction mixture containing $CF_3OCOF$ can directly be fed, without separation of the mixture components, in the reactor of step I. In this way the whole process results particularly simple and effective. As said, the $CF_3OF$ conversion and the selectivity to $CF_3OCOF$ are high (see the Examples).

In the described process for preparing $CF_3OCOF$ by increasing the reaction temperature in the range 80° C.-250° C., the conversion increases but a high selectivity is substantially maintained.

Another process for preparing $CF_3OCOF$ is by photochemical route in liquid phase in the presence of ultraviolet radiations at temperatures in the range 0° C.-100° C., preferably 20° C.-50° C., by feeding the two reactants into a reactor equipped with a mercury high pressure UV lamp, contained in a cooled quartz sheath, dipped in the reaction mixture. The Applicant has found that this process has a high selectivity. Further higher yields are obtained in comparison with the reaction carried out in gaseous phase. This process is carried out in the presence of an inert perfluorinated solvent and at the liquid state under the reaction conditions, preferably selected from perfluorocarbons, perfluoropolyethers, perfluorinated tertiary amines, fluorochlorocarbons, or their mixtures.

In the process for preparing $CF_3OCOF$, when the $CF_3OF$ conversion is not quantitative, the gaseous flow coming out from the reactor contains a mixture formed of the reaction product together with unconverted reactants. $CF_3OF$ can be removed by passing the gaseous flow in a cold trap containing a fluorinated olefin, for example $CFCl=CFCl$. The latter reacts with $CF_3OF$ forming a fluorohalogen-ether; then, by fractional distillation, $CF_3OCOF$ is separated and it is available for step I.

Alternatively the gaseous flow coming out from the reactor can be cooled down to condensate the fluoroformate $CF_3OCOF$, then separating $CF_3OF$ and CO and their recycle into the reactor by keeping the $CF_3OF/CO$ ratio in the above limits.

Preferably $CF_3OCOF$ is prepared by reacting the fluoroxyperfluoromethane and carbon oxide at temperatures from 80° C. to 250° C.

The reactor, where $CF_3OCOF$ is prepared, is preferably made of glass, inert perfluorinated plastics as for example PTFE, PFA, metal alloys, for example AISI 316, preferably coated, where the reaction takes place, with glass or perfluorinated plastics. More preferably, glass or fluorinated plastics are used.

The fluoroelastomers of the present invention, as said, show an improved combination, at high temperatures, of mechanical properties, in particular modulus, stress at break and elongation at break, of elastomeric properties as shown by the compression set, and of thermal resistance, and contemporaneously an improved combination of the above properties also at low temperatures, even at –0° C. and at –25° C.

The cured fluoroelastomers of the present invention can be used as manufactured articles for uses as o-ring, shaft seal, fuel hoses, gaskets, in particular at temperatures lower than 0° C. down to –25° C.

The following Examples illustrate with non limitative purposes the present invention.

EXAMPLES

Analytical Methods

Determination of the Polymer Tg

The Tg has been determined by DSC analysis according to the ASTM D 3418 standard. The mid-point and onset Tg values have been determined.

Determination of the Polar —COF End Groups

At the end of the polymerization of the monomer the polymer is isolated through coagulation by freezing at –20° C. and successive defrosting at room temperature until obtaining a slurry wherein the polymer deposits on the bottom; then the polymer is washed twice with demineralized water and dried in stove at 90° C. up to a constant weight (about 12 hours); the —COF end polymer groups are determined by FT-IR spectroscopy, by using the Nicolet® Nexus FT-IR equipment (256 scannings, resolution 2 cm$^{-1}$) on a polymer film having a thickness from 50 to 300 micron by initially scanning between 4000 cm$^{-1}$ and 400 cm$^{-1}$ to obtain the initial spectrum, keeping the film for 12 hours in environment saturated with ammonia vapours and then recording the IR final spectrum under the same conditions of the initial IR spectrum; subtraction from the initial spectrum the final spectrum to obtain the "difference spectrum", which is normalized by the following equation:

$$\frac{\text{"Difference spectrum"}}{[\text{film weight (g)/film area (cm}^2)]};$$

then the optical densities related to the —COF end groups which have reacted with the ammonia vapours are measured, —COF end groups with this reactant give rise to detectable peaks; the optical densities are converted into mmoles/kg of polymer by using the molar extinction coefficient of the —COF group at 1884 cm$^{-1}$, equal to 215 liters/(moles×cm), as reported in Table 1, page 73, of the article by M. Pianca et al. "End groups in fluoropolymers", J. Fluorine Chem. 95 (1999), 71-84 (herein incorporated by reference); the found values express the concentrations of the residual —COF end groups as mmoles of —COF end groups/kg of polymer: in the fluoroelastomer spectrum of the invention no bands related to —COF end groups (1900-1830 cm$^{-1}$) are detectable, the method sensitivity limit being 0.05 mmoles/Kg.

Compression Set

The compression set is determined on the cured specimens after a residence time of 24 h (ASTM D 395/B) at –10° C. and at –25° C.

TR10 Determination

TR10 is determined according to the ASTM D 1329 standard. For the determination, as a reference specimen, a VDF/HFP copolymer having molar composition VDF 78.4% and HFP 21.6% has been used, which has given a TR10 value –17° C. The copolymer was prepared as described hereinafter.

In a vertical 10 l reactor, equipped with a stirrer working at 545 rpm, 6.5 l of water are introduced.

The reactor is heated up to 85° C. and then brought to the pressure of 19 relative bar (1.9 MPa) by monomer feeding until having the following molar composition in the reactor top: VDF=53%, HFP=47%.

7.8 g of ammonium persulphate (APS) and 14.8 g of ethyl acetate are fed into the reactor. The ethyl acetate is fed in an amount of 7.4 g at 5% of the monomer conversion and the remaining part splitted in 4 subsequent additions, each of 1.85 g, respectively at 24%, 43%, 62% and 81% of the monomer conversion.

The pressure is maintained constant for the whole polymerization by feeding a mixture formed of:

VDF=78.5% by moles,

HFP=21.5% by moles.

After 70 minutes the reaction is stopped.

The latex is coagulated by using an electrolyte agent (aluminum sulphate), washed and dried at 80° C. for 24 h.

2850 g of polymer are obtained.

By $^{19}F$ NMR analysis the polymer results to have the following composition, on a molar basis: 78.4% of VDF and 21.6% of HFP.

Example A

Preparation of $CF_3OCOF$ by Thermal Reaction at 170° C. in Glass Reactor

A tubular glass reactor is used, having internal diameter of 55.6 mm and length 510 mm, filled with 6×6 Rashig glass rings (free internal volume 842 ml), maintained thermostated by electrical resistances.

In the reactor, maintained at the temperature of 170° C., a $CF_3OF$ gaseous flow (1.5 liters/hour), synthesized as described in U.S. Pat. No. 4,400,872 and, contemporaneously, a CO flow (1.5 liters/hour) are fed for 5 hours. The flow coming out from the reactor is continuously analyzed by gaschromatographic analysis on line.

The flow is then condensed, except CO, in a trap maintained at −110° C. containing 15 g of CFCl=CFCl (A 1112), so that the residual $CF_3OF$ reacts with the olefin to give $CF_3OCFClCF_2Cl$.

After fractional distillation of the resulting mixture 33.9 g of $CF_3OCOF$ pure at 99.8% (molar yield on the fed $CF_3OF$ 76.5%); 12.3 g of $CF_3OCFClCF_2Cl$; 3.4 g of $COF_2$, are obtained.

The conversion is 84.5% and the selectivity 90%, calculated on the fed $CF_3OF$.

Example B

Preparation of $CF_3OCOF$ by Thermal Reaction at 170° C. in PTFE Reactor

A tubular thermostated PTFE reactor, having an internal diameter of 4 mm and a length of 13.2 m is used.

In the reactor, maintained at the temperature of 170° C., a gaseous flow of $CF_3OF$ (1.5 liters/hour) and, contemporaneously, a flow of CO (2.0 liters/hour) are fed.

The flow coming out from the reactor, analyzed by gaschromatography, has the following molar composition: 7.3% $CF_3OF$, 54.2% $CF_3OCOF$, 9.1% $COF_2$ and 29.4% CO.

Example C

Preparation of $CF_3OCOF$ by Thermal Reaction at 120° C. in PTFE Reactor

In the same reactor used in the Example B, maintained at the temperature of 120° C., a gaseous flow of $CF_3OF$ (1.5 liters/hour) and, contemporaneously, a flow of CO (2.0 liters/hour) are fed for 6 hours. The flow coming out from the reactor is analyzed by gaschromatography and has the following molar composition, leaving out CO in excess: 86.7% $CF_3OF$, 13.3% $CF_3OCOF$.

The flow is then condensed, except CO, in a trap maintained at −110° C. containing 50 g of A 1112, so that the residual $CF_3OF$ reacts with the olefin.

After fractional distillation of the resulting mixture 6.8 g of $CF_3OCOF$ pure at 99% are obtained.

The selectivity is 98%, calculated on the converted $CF_3OF$ The conversion is 13.0%.

Example D

Preparation of $CF_3OCOF$ by Thermal Reaction at 170° C. in AISI 316 Reactor

A tubular thermostated AISI 316 reactor having internal diameter of 4 mm and a length of 11.3 m is used.

In the reactor, maintained at the temperature of 170° C., a gaseous flow of $CF_3OF$ (1.5 liters/hour) and, contemporaneously, a flow of CO (1.5 liters/hour) are fed for 6 hours.

The gaseous flow coming out from the reactor is condensed in a trap maintained at −110° C. containing 30 g of A 1112.

After fractional distillation of the trap content 31.2 g of $CF_3OCOF$ pure at 99%, 31.8 g of fluorohalogenether and 3.7 g of $COF_2$ are obtained. The conversion is 66.6% and the selectivity 86.5%.

Example E

Preparation of $CF_3OCOF$ by Photochemical Reaction

In a 300 ml cylindrical glass reactor, equipped with stirrer and UV lamp Hanau TQ 150, with 150 W power and 1 cm optical route, 500 g of a perfluoropolyether Galden®LS-165 are introduced. Then 2.0 liters/hour of $CF_3OF$ diluted with 3.0 liters/hour of He, and 2.0 liters/hour of CO, are contemporaneously fed for 5 hours.

The gases flowing out from the reactor are condensed in a trap maintained at −110° C. containing 30 g of A 1112. After fractional distillation of the condensed mixture 22.9 g of $CF_3OCOF$ pure at 99%, 41.8 g of fluorohalogenether $CF_3OCFClCF_2Cl$, 5.8 g of $COF_2$, 5.4 g of trifluoromethyl carbonate are obtained.

The $CF_3OF$ conversion is 60.5%. The selectivity is 63.6%.

Example F

Obtainment of the Monomer of Formula (a) by Reaction of $CF_3OCOF$ with Elemental Fluorine and a Fluoroolefin of Formula CFCl=CFCl and Subsequent Dehalogenation of the Fluorohalogenether 20 g of CFCl=CFCl (A 1112), 30 g of $CF_3OCOF$ obtained as in the Example A are transferred in a 50 ml glass reactor. The formed solution is maintained at −100° C. and fluorine diluted with nitrogen at a flow-rate of 1 liter/hour is bubbled.

The mass balance at the end of the reaction is 92%, the $^{19}F$-NMR analysis on the reaction raw product (52 g) shows that the fluoroformate conversion is 54% and the selectivity to give the fluorohalogenether $CF_3OCF_2OCFClCF_2Cl$ is 93%. The unreacted fluoroformate is removed from the reaction raw product by adding water, under stirring. It is allowed to reach 25° C., the organic phase is recovered and is dried over $MgSO_4$. The mixture is filtered and the obtained residue is distilled and the fraction of 31.8 g boiling at 74° C. corresponding to the fluorohalogenether pure at 99% is recovered.

The fluorohalogenether dehalogenation is carried out by using an 1 liter flask equipped with mechanical stirrer, thermometer, dropping funnel, distillation column and trap at −78° C. 450 ml of dimethylformamide (DMF), 62 g of zinc in powder and 8.3 g of $ZnCl_2$ are introduced in the flask. The temperature in the suspension is brought to 80° C. and 150 g of the fluorohalogenether isolated in the previous reaction are added. When the addition is over, it is allowed to react for one hour. At the end the temperature is gradually increased up to 120° C. and it is still allowed to react for one hour. At the end it is disconnected and 106 g of the monomer of formula (a) $CF_3OCF_2OCF=CF_2$ pure at 99% (boiling point 23° C.) are recovered therefrom.

Example 1

Copolymer VDF/TFE/HFP/Monomer (a) 77/7/12/4% by Moles 3.5 liters of demineralized water have been introduced after air removal in a 5 liter autoclave, equipped with stirrer working at 630 rpm.

The inside of the autoclave was heated to 85° C. and maintained at this temperature for the whole reaction. The inside of the autoclave is then pressurized at 20 bar (2.0 MPa) with the following mixture of monomers, the composition by moles % being: VDF 67.4%, TFE 3.4%, HFP 26.0%, monomer of formula (a) 3.2%.

In the autoclave are then introduced:

4.55 g of ammonium persulphate (APS) as initiator;

7.53 ml of ethyl acetate;

the addition of the compound was carried out for a total of 5 portions, each of 1.51 ml, starting from the beginning of the polymerization and for every 20% increase in the monomer conversion.

The pressure of 20 bar (2.0 MPa) is maintained constant for the whole polymerization by feeding the mixture (% by moles): VDF 78.7%, TFE 3.9%, HFP 13.3%, monomer of formula (a) 4.1%.

After 54 minutes of reaction, corresponding to 100% of monomer conversion, the autoclave is cooled and the latex discharged.

The latex is coagulated with an ammonium sulphate solution (6 grams of $Al_2(SO_4)_3$ for each liter of latex) and dried at 90° C. in an air circulation stove for 24 hours.

983 g of polymer are obtained.

The amount of reacted monomer with respect to that fed results to be 83.4%.

By $^{19}$F-NMR analysis of the polymer hot dissolved in acetone the molar percentage in the polymer of the monomer (a) equal to 3.7%, of VDF equal to 77.1%, of TFE equal to 6.7%, of HFP equal to 12.5%, is determined.

The $T_g$ determined by DSC is −29.5° C. (midpoint) and −32.8° C. (onset).

The obtained polymer is mixed in a roll open mixer with the crosslinking additives in ratios in phr as indicated in Table 1. The mechanical properties and the compression set are reported in Table 1.

Example 2

Comparative

The industrial polymer trademark L636® marketed by Solvay Solexis is used.

By $^{19}$F-NMR analysis of the polymer hot dissolved in acetone, the molar percentage of the monomers in the polymer is the following: VDF 77.5%, TFE 6.5%, PMVE 4.0%, HFP 12%.

The $T_g$ determined by DSC is −27.0° C. (midpoint) and −31° C. (onset).

The obtained polymer is mixed in a roll open mixer with the crosslinking additives in the ratios in phr as indicated in Table 1. The mechanical properties and the compression set are reported in Table 1.

Example 3

Copolymer VDF/TFE/HFP/PMVE/Monomer (a) 67/7/11/5/10% by Moles 3.5 liters of demineralized water are introduced after air removal in a 5 liter autoclave, equipped with stirrer working at 630 rpm.

The inside of the autoclave was heated to 85° C. and maintained at this temperature for the whole reaction. The inside of the autoclave is then pressurized at 20 bar (2.0 MPa) with the following monomer mixture, the composition by moles % being: VDF 52.5%, TFE 4.0%, HFP 29.8%, PMVE 6.6%, monomer of formula (a) 7.2%.

In the autoclave are then introduced:

4.55 g of ammonium persulphate (APS) as initiator;

7.53 ml of ethyl acetate;

the addition of the compound was carried out for a total of 5 portions, each of 1.51 ml, starting from the beginning of the polymerization and for every 20% increase in the monomer conversion.

The pressure of 20 bar (2.0 MPa) is maintained constant for the whole polymerization by feeding the mixture (% by moles): VDF 64.3%, TFE 7.2%, HFP 13.2%, PMVE 5.2%, monomer of formula (a) 10%.

After 53 minutes of reaction, corresponding to 100% of monomer conversion, the autoclave is cooled and the latex discharged.

The latex is coagulated with an ammonium sulphate solution (6 grams of $Al_2(SO_4)_3$ for each liter of latex) and dried at 90° C. in an air circulation stove for 24 hours.

992 g of polymer are obtained.

The amount of reacted monomer with respect to that fed results to be 95.1%.

By $^{19}$F-NMR analysis of the polymer hot dissolved in acetone the molar percentage in the polymer of the monomer (a) equal to 10.1%, of VDF equal to 66.6%, of TFE equal to 7.4%, of HFP equal to 10.7, of PMVE equal to 5.2%, is determined.

The $T_g$ determined by DSC is −31.9° C. (midpoint) and −34.7° C. (onset).

The obtained polymer is mixed in a roll open mixer with the crosslinking additives in ratios in phr as indicated in Table 2. The mechanical properties and the compression set are reported in Table 2.

Example 4

Copolymer VDF/TFE/HFP/PMVE/Monomer (a) 68/9/12/5/6% by Moles 3.5 liters of demineralized water are introduced after air removal in a 5 liter autoclave, equipped with stirrer working at 630 rpm.

The inside of the autoclave was heated to 85° C. and maintained at this temperature for the whole reaction. The inside of the autoclave is then pressurized at 20 bar (2.0 MPa) with the following monomer mixture, the composition by moles % being: VDF 44.8%, TFE 3.3%, HFP 28.3%, PMVE 15.2%, monomer of formula (a) 8.4%.

In the autoclave are then introduced:

4.55 g of ammonium persulphate (APS) as initiator;

7.53 ml of ethyl acetate;

the addition of the compound was carried out for a total of 5 portions, each of 1.51 ml, starting from the beginning of the polymerization and for every 20% increase in the monomer conversion.

The pressure of 20 bar (2.0 MPa) is maintained constant for the whole polymerization by feeding the mixture (% by moles): VDF 67.0%, TFE 7.6%, HFP 14.8%, PMVE 5.4%, monomer of formula (a) 5.2%.

After 55 minutes of reaction, corresponding to 100% of monomer conversion, the autoclave is cooled and the latex discharged.

The latex is coagulated with an ammonium sulphate solution (6 grams of $Al_2(SO_4)_3$ for each liter of latex) and dried at 90° C. in an air circulation stove for 24 hours.

987 g of polymer are obtained.

The amount of reacted monomer with respect to that fed results to be 87.0%.

By $^{19}$F-NMR analysis of the polymer hot dissolved in acetone the molar percentage in the polymer of the monomer (a) equal to 5.9%, of VDF equal to 67.8%, of TFE equal to 8.8%, of HFP equal to 12.2, of PMVE equal to 5.3%, is determined.

The $T_g$ determined by DSC is $-27.7°$ C. (midpoint) and $-30.5°$ C. (onset).

The obtained polymer is mixed in a roll open mixer with the crosslinking additives in ratios in phr as indicated in Table 2. The mechanical properties and the compression set are reported in Table 2.

Example 5

Copolymer VDF/TFE/HFP/PMVE/Monomer (a) 70/9/13/5/3% by Moles 3.5 liters of demineralized water are introduced after air removal in a 5 liter autoclave, equipped with stirrer working at 630 rpm.

The inside of the autoclave was heated to 85° C. and maintained at this temperature for the whole reaction. The inside of the autoclave is then pressurized at 20 bar (2.0 MPa) with the following monomer mixture, the composition by moles % being: VDF 50.0%, TFE 4.3%, HFP 36.8%, PMVE 6.3%, monomer of formula (a) 2.6%.

In the autoclave are then introduced:
4.55 g of ammonium persulphate (APS) as initiator;
7.53 ml of ethyl acetate;
the addition of the compound was carried out for a total of 5 portions, each of 1.51 ml, starting from the beginning of the polymerization and for every 20% increase in the monomer conversion.

The pressure of 20 bar (2.0 MPa) is maintained constant for the whole polymerization by feeding the mixture (% by moles): VDF 69.1%, TFE 8.2%, HFP 15.1%, PMVE 5.5%, monomer of formula (a) 2.1%.

After 54 minutes of reaction, corresponding to 100% of monomer conversion, the autoclave is cooled and the latex discharged.

The latex is coagulated with an ammonium sulphate solution (6 grams of $Al_2(SO_4)_3$ for each liter of latex) and dried at 90° C. in an air circulation stove for 24 hours.

976 g of polymer are obtained.

The amount of reacted monomer with respect to that fed results to be 89.7%.

By $^{19}$F-NMR analysis of the polymer hot dissolved in acetone the molar percentage in the polymer of the monomer (a) equal to 2.7%, of VDF equal to 69.6%, of TFE equal to 9.0%, of HFP equal to 13.5, of PMVE equal to 5.2%, is determined.

The $T_g$ determined by DSC is $-25.0°$ C. (midpoint) and $-27.6°$ C. (onset).

The obtained polymer is mixed in a roll open mixer with the crosslinking additives in ratios in phr as indicated in Table 2. The mechanical properties and the compression set are reported in Table 2. In the Tables FORXA51® is the commercial name of the Bisphenol AF/1,1,-diphenyl-1-benzyl-N-diethylphosphoramine adduct in the 5/1 weight ratio.

Comments to the Tables

From Tables 1 and 2 one deduces that the compression set values at the temperatures of $-10°$ C. and $-25°$ C. for the polymers of the invention result lower than those of the comparative example. Furthermore, the polymers of the invention result to have good values at 200° C. of mechanical properties and compression set.

TABLE 1

| Examples | | 1 | 2 comp |
|---|---|---|---|
| Polymer Ex. 1 | | 100 | |
| Polymer Ex. 2 comp | phr | | 100 |
| XA51 | " | 2.5 | 2.5 |
| MgO | " | 3 | 3 |
| Ca(OH)$_2$ | " | 6 | 6 |
| MT N990 | " | 30 | 30 |
| Mechanical properties after post cure (p.c.) 250° C. × 24 h | | | |
| M100 | Mpa | 5.8 | 5.4 |
| CR | Mpa | 15.3 | 15.2 |
| AR | % | 183 | 196 |
| Hardness | Sh. A | 68 | 71 |
| Compression set O-R 200° C. × 70 h (%) | % | 18 | 18 |
| Compression set O-R $-10°$ C. × 24 h (%) | % | 33 | 67 |
| Compression set O-R $-25°$ C. × 24 h (%) | % | 56 | 98 |
| TR 10° C. | | $-26$ | $-21$ |

TABLE 2

| Examples | | 3 | 4 | 5 |
|---|---|---|---|---|
| Polymer | phr | 100 | 100 | 100 |
| XA51 | " | 2.5 | 2.5 | 2.5 |
| MgO | " | 3 | 3 | 3 |
| Ca(OH)$_2$ | " | 6 | 6 | 6 |
| MT N990 | " | 30 | 30 | 30 |
| Mechanical properties after post cure (p.c.) 250° C. × 24 h | | | | |
| M100 | Mpa | 5.5 | 5.1 | 6.8 |
| CR | Mpa | 15.6 | 17.0 | 19.1 |
| AR | % | 195 | 231 | 210 |
| Hardness | Sh. A | 68 | 68 | 70 |
| Compression set O-R 200° C. × 70 h (%) | % | 21 | 21 | 21 |
| Compression set O-R $-10°$ C. × 24 h (%) | % | 29 | 32 | 45 |
| Compression set O-R $-25°$ C. × 24 h (%) | % | 50 | 52 | 74 |

The invention claimed is:

1. Ionically cured VDF fluoroelastomers, having a compression set after 24 hours at $-10°$ C. lower than 60%, comprising hexafluoropropene (HFP) in an amount higher than 10% by moles and a vinylether of formula:

$$CF_2\!=\!CFOCF_2OCF_3 \qquad (a)$$

and having an amount of —COF end polymer groups of less than 0.05 mmoles/Kg.

2. Cured fluoroelastomers according to claim 1, comprising amounts between 0.01 and 5% by moles of units derived from a fluorinated bis-olefin.

3. Cured fluoroelastomers according to claim 2, wherein the bis-olefin optionally used has formula:

$$CH_2\!=\!CH\!-\!(CF_2)_{t0}\!-\!CH\!=\!CH_2$$

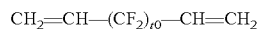

wherein t0 is an integer from 6 to 10.

4. A mixture, comprising:
the cured fluoroelastomers according to claim 1; and a semicrystalline (per)fluoropolymer;
the fluoroelastomer amount, expressed in percent by weight referred to the total of the dry weight of the mixture fluoroelastomer+semicrystalline (per)fluoropolymer being from 0% to 70% by weight.

5. The mixture according to claim 4, wherein the semicrystalline (per)fluoropolymer is formed of tetrafluoroethylene (TFE) homopolymers, or TFE copolymers with one or more monomers containing at least one unsaturation of ethylene type in amounts from 0.01% to 10% by moles.

6. The mixture according to claim 5, wherein the comonomers having an ethylene unsaturation are of hydrogenated and fluorinated type.

7. The mixture according to claim 5, wherein the hydrogenated comonomers are ethylene, propylene, acrylic monomers, styrene monomers.

8. The mixture according to claim 5, wherein the fluorinated comonomers are selected from the following:
$C_3$-$C_8$ perfluoroolefins;
$C_2$-$C_8$ hydrogenated fluoroolefins;
$CH_2=CH-R_f$ perfluoroalkylethylene, wherein Rf is a $C_1$-$C_6$ perfluoroalkyl;
$C_2$-$C_6$ chloro- and/or bromo- and/or iodo-fluoroolefins;
$CF_2=CFOR_f$ (per)fluoroalkylvinylethers (PAVE), wherein $R_f$ is a $C_1$-$C_6$ (per)fluoroalkyl;
$CF_2=CFOX$ (per)fluoro-oxyalkylvinylethers, wherein X is: a $C_1$-$C_{12}$ alkyl, or a $C_1$-$C_{12}$ oxyalkyl or a $C_1$-$C_{12}$ (per)fluorooxyalkyl having one or more ether groups; and
fluorodioxoles.

9. The mixture according to claim 5, wherein the comonomers are PAVES and fluorodioxoles.

10. A mixture, comprising:
the cured fluoroelastomers according to claim 1; and
fluoroelastomers obtainable from polymers containing an amount of —COF end groups higher than 0.05 mmoles/Kg,
the amount of the fluoroelastomers having an amount of —COF end groups lower than 0.05 mmoles/Kg being at least 5% by weight with respect to the total weight of the fluoroelastomers in the mixture.

11. The mixture according to claim 10, wherein the fluoroelastomer polymers containing —COF end groups in amounts higher than 0.05 mmoles/Kg comprise the following comonomers:
(per)fluorodioxoles having the following formula:

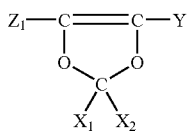

wherein
Y=F, $ORf_1$, $Rf_1$, being a $C_1$-$C_5$ perfluoroalkyl;
$X_1$ and $X_2$, equal to or different from each other, are selected between F and $CF_3$;
$Z_1$ is selected from F, H, Cl;
perfluoroalkylvinylethers of formula $CF_2=CFORf$, wherein Rf is a $C_3$ perfluoroalkyl;
$CF_2=CFOXa$ perfluorooxyalkylvinylethers, wherein Xa is $C_3$-$C_{12}$ perfluorooxyalkyl having one or more ether groups, for example perfluoro-2-propoxy-propyl;
fluorovinylethers (MOVE) of general formula $CFX_{AI}=CX_{AI}OCF_2OR_{AI}$, wherein $R_{AI}$ is a linear, branched $C_2$-$C_6$ (per)fluoroalkyl group, or $C_5$-$C_6$ cyclic, or a linear or branched when possible $C_2$-$C_6$ (per)fluorooxyalkyl group, containing from one to three oxygen atoms; when $R_{AI}$ is fluoroalkyl or fluorooxyalkyl group as defined above it can contain from 1 to 2 atoms, equal or different, selected from the following: H, Cl, Br, I; $X_{AI}$=F, H.

12. Cured fluoroelastomers according to claim 1, comprising the following monomers (% by moles):
VDF from 40 to 90%;
monomer of formula (a) from 2 to 20%;
HFP from 10 to 30%;
optionally one or more (per)fluorinated comonomers having at least one unsaturation of ethylene type, from 0 to 30%;
the sum of the molar percentages of the monomers being 100%.

13. Cured fluoroelastomers according to claim 12, wherein the comonomers having one ethylene unsaturation are selected from the following:
$C_2$-$C_8$ perfluoroolefins, for example TFE, hexafluoroisobutene;
perfluoroalkylvinylethers of formula $CF_2=CFORf$, wherein Rf is a $C_1$-$C_2$ perfluoroalkyl.

14. Cured fluoroelastomers according to claim 13, wherein the comonomers having one ethylene unsaturation are tetrafluoroethylene (TFE) and/or perfluoromethylvinylether (PMVE).

15. Cured fluoroelastomers according to claim 12, having the following composition (% moles), the sum of the molar monomer percentages being 100%:
VDF from 40 to 90%;
monomer of formula (a) from 2 to 20%;
HFP from 10 to 30%;
optionally
PMVE from 0 to 15%; and/or
TFE from 0 to 30%.

16. Cured fluoroelastomers according to claim 1, wherein the ionic curing is carried out by using accelerating agents selected from organic-opium derivatives and curing agents.

17. Cured fluoroelastomers according to claim 16, wherein the organic-opium derivatives contain at least one heteroatom, for example N, P, S, O linked to organic or inorganic groups.

18. Cured fluoroelastomers according to claim 16, wherein the organic-opium compounds are selected from the following classes:
A) compounds having general formula:

wherein:
Q has the following meanings: nitrogen, phosphorus, arsenic, antimony, sulphur;
$X_1$ is an organic or inorganic anion; n is the valence of the $X_1$ ion;
$R^2$, $R^3$, $R^4$, $R^5$, independently the one from the other, have the following meanings:

$C_1$-$C_{20}$ alkyl, $C_6$-$C_{20}$ aryl or arylalkyl, $C_1$-$C_{20}$ alkenyls, or a combination thereof;

halogen, selected from chlorine, fluorine, bromine;

or cyano groups, —$OR_B$ and $COOR_B$, wherein $R_B$ is an alkyl, aryl, arylalkyl or alkenyl having the above meanings;

wherein two radicals of the $R^2$, $R^3$, $R^4$, $R^5$ groups can form with the heteroatom Q a cyclic structure;

when Q is a sulphur atom one of the $R^2$, $R^3$, $R^4$, $R^5$ radicals is not present;

B) amino-phosphonium derivatives having the following general formulas:

 (II)

 (III)

wherein:

$R^6$, $R^7$ and $R^8$, equal or different, have the following meanings:

$C_1$-$C_{18}$, $C_4$-$C_7$ cycloalkyl, $C_6$-$C_{18}$ aryl or arylalkyl;

oxyalkyl or poly(oxyalkyl) wherein the alkyl is as above and the polyoxyalkyl radical has a free or etherified terminal OH function;

$R^6$, $R^7$ and $R^8$ can optionally contain halogens, CN, OH, carbalkoxy groups;

wherein $R^6$ and $R^7$ can form with the nitrogen atom an heterocyclic ring;

$R^9$ is a $C_1$-$C_6$ alkylenic, oxyalkylenic or $C_6$-$C_{12}$ arylenic bivalent radical;

nl is an integer from 1 to 4;

r is an integer from 1 to 3;

ml is an integer from 1 to 2 and corresponds to the valence of the Y ion;

p is a coefficient such that ml×p=2;

Y is an anion having m valence and can be organic or inorganic; Y can also be a complex anion for example $ZnCl_4^{2-}$, $CdCl_4^{2-}$, $NiBr_4^{2-}$, $HgI_3^-$;

C) phosphoranes, in particular triarylphosphoranes, having formula:

 (IV)

wherein:

Ar is phenyl, substituted phenyl;

$R^{10}$ is hydrogen, methyl, ethyl, propyl, carbalkoxy; $R^{11}$ is carbalkoxy, $C_1$-$C_8$ alkyls, cyano and amidic group;

or $R^{10}$ with $R^{11}$ with the carbon atom of the P=C bond forms a cyclic group;

D) iminium salts having formula:

 (V)

wherein:

$R^{12}$ is a monovalent organic radical ended with one heteroatom, as P, S, O or N, such that the organic radical is covalently linked to the nitrogen atom through said heteroatom;

c is the valence of the $X_c$ anion;

$X_c$ is an organic or inorganic anion.

19. Cured fluoroelastomers according to claim 18, wherein the organic-onium derivatives of class A) are selected from the group consisting of triphenylbenzylphosphonium chloride, tetraphenylphosphonium chloride, tetrabutylammonium chloride, tetrabutylammonium bisulphate, tetrabutylammonium bromide, tributylallylphosphonium chloride, tributylbenzylphosphonium chloride, dibutyldiphenylphosphonium chloride, tetrabutylphosphonium chloride, triarylsulphonium chloride;

the amino-phosphonium derivatives of class B) are selected from the group consisting of benzyldiphenyl (diethylamino)phosphonium and benzyltris(dimethylamino) phosphonium salts.

20. Cured fluoroelastomers according to claim 16, wherein the curing agents are aromatic or aliphatic polyhydroxylated compounds or their derivatives.

21. Cured fluoroelastomers according to claim 20, wherein the curing agents are selected from the group consisting of di-, tri- and tetrahydroxybenzenes, naphthalenes, anthracenes and bisphenols of formula:

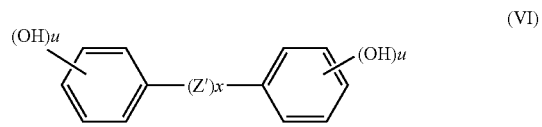 (VI)

wherein:

Z' has one of the following meanings:

linear or branched $C_1$-$C_3$ aliphatic, $C_4$-$C_{13}$ cycloaliphatic, $C_6$-$C_{13}$ aromatic or arylalkylenic bivalent radical, optionally substituted with at least one chlorine or fluorine atom;

a thio, oxy, carbonyl, sulphinyl or sulphonyl radical;

x is 0 or 1;

u is 1 or 2;

the aromatic rings of the compound of formula (VI) can optionally have other substituents selected from chlorine, fluorine or bromine; —CHO, $C_1$-$C_6$ alkoxy, —$COOR_{10}$, wherein $R_{10}$ is H or $C_1$-$C_8$ alkyl, $C_6$-$C_{14}$ aryl, $C_4$-$C_{12}$ cycloalkyl.

22. Cured fluoroelastomers according to claim 21, wherein the curing agents of formula (VI) are hexafluoroiso-propylidene bis(4-hydroxybenzene), 4,4' dihydroxy-diphenylsulphone and isopropylidene bis(4-hydroxybenzene).

23. Cured fluoroelastomers according to claim 16, wherein, instead of the accelerating and curing agent, an adduct between the accelerating agent and the curing agent can be used.

24. Cured fluoroelastomers according to claim 23, wherein the adduct is formed of bisphenol and an -onium salt.

25. Cured fluoroelastomers according to claim 23, wherein, besides the adduct, an amount of free accelerating agent in addition to that contained in the adduct; and/or an amount of free curing agent in addition to that contained in the adduct, is also present.

26. Cured fluoroelastomers according to claim 23, wherein in the adduct the cations are the following:

1,1-diphenyl-1-benzyl-N-diethyl-phosphoranamine, tetrabutyl phosphonium, tetrabutyl ammonium; among the anions are the bisphenol compounds wherein the two aromatic rings are linked by an alkylenic group selected from the perfluoroalkylenic groups having from 3 to 7 carbon atoms, and the OH in the aromatic rings are in para position.

27. Cured fluoroelastomers according to claim 1, wherein the curing blend contains:
   i) one or more acceptors of inorganic acids selected from those known in the ionic curing of vinylidene fluoride copolymers in amounts 1-40 parts per 100 parts of fluoroelastomeric copolymer;
   ii) one or more basic compounds selected from those known in the ionic curing of vinylidene fluoride copolymers in amounts from 0.5 to 10 parts per 100 parts of fluoroelastomeric copolymer.

28. Cured fluoroelastomers according to claim 27, wherein the basic compounds ii) are selected from $Ca(OH)_2$, $Sr(OH)_2$, $Ba(OH)_2$, the metal salts of weak acids, and mixtures of said hydroxides with said metal salts.

* * * * *